March 24, 1936.  C. NIELSEN ET AL  2,035,092
VULCANIZING KETTLE
Filed Nov. 24, 1933
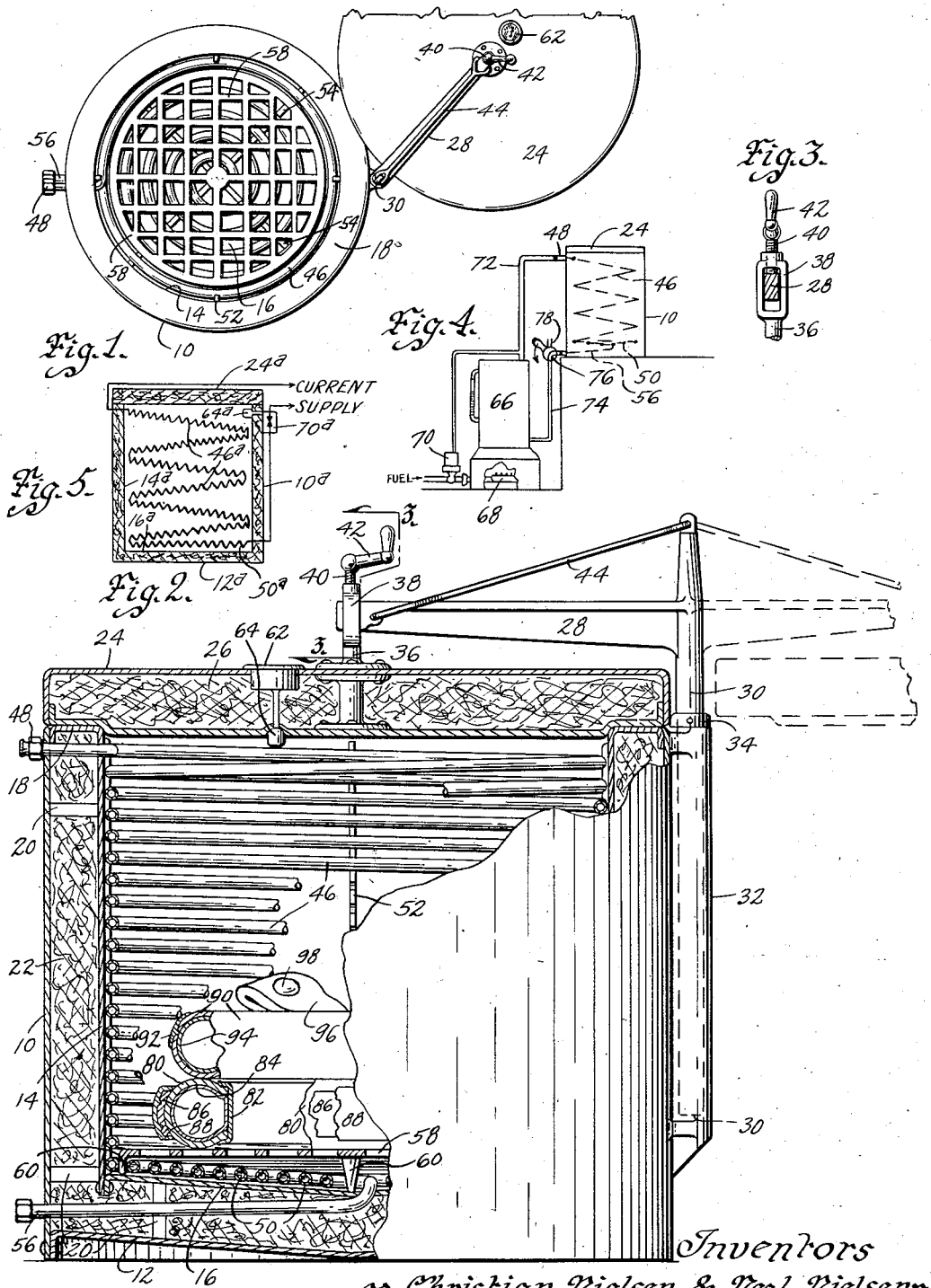
Inventors
Christian Nielsen & Neal Nielsen
by Bair, Freeman & Sinclair
Attorneys
Witness
Ray Usher Patented Mar. 24, 1936

2,035,092

UNITED STATES PATENT OFFICE 2,035,092

VULCANIZING KETTLE

Christian Nielsen and Neal Nielsen,
Spencer, Iowa

Application November 24, 1933, Serial No. 699,584

6 Claims. (Cl. 18—6)

An object of our invention is to provide a vulcanizing kettle which is simple and durable in construction and economical to operate, the kettle vulcanizing rubber goods and the like by a process involving the introduction of the rubber goods within the kettle and the heating of the interior of the kettle.

A further object is to provide against the escape of heat from the vulcanizing kettle by heavily insulating all walls of it including a removable cover.

A further object is to provide a vulcanizing kettle within which entire tire casings, inner tubes and other rubber articles can be placed, the kettle having a capacity for one or many articles, as desired, and being usable for vulcanizing all kinds of rubber goods.

A further object is to provide a vulcanizing kettle which is universally adaptable for vulcanizing new retread rubber on worn casings, patches on casings, inner tubes, boots or other rubber goods by the simple process of placing them within the kettle and then closing the kettle, steam or other heating medium being caused to circulate through a coil of tubing which lines the interior wall of the kettle, thus creating a high temperature atmosphere confined within the kettle, which quickly penetrates to the center of any piece of rubber therein and thereby immediately starts the vulcanizing process.

With these and other objects in view our invention consists in the construction, arrangement and combination of the various parts of our device and in the practice of the process, whereby the objects contemplated are attained, as hereinafter more fully set forth, pointed out in our claims, and illustrated in the accompanying drawing, in which:

Figure 1 is a plan view of our vulcanizing kettle showing the lid swung to one side out of the way.

Figure 2 is a vertical partly central sectional view of the kettle showing it in closed position.

Figure 3 is a detailed sectional view on the line 3—3 of Figure 2.

Figure 4 is a diagrammatic view showing the connection of our vulcanizing kettle with a steam generator; and Figure 5 is a semidiagrammatic view of a form of the invention having a different type of heating means for the vulcanizing kettle.

On the accompanying drawing, we have used the reference numeral 10 to indicate an outer tank. The tank 10 has a bottom 12. The tank and bottom may be made of sheet metal or the like, preferably galvanized and of sufficient thickness to withstand the usage to which the apparatus is to be put.

Within the outer tank 10, we provide an inner tank 14 having a bottom 16 and a top flange 18. The tanks 10 and 14 are spaced from each other, suitable spacers 20 being provided for this purpose if found necessary. The entire space between the tanks 10 and 14 is filled with insulating material 22, preferably the kind that can be packed in between the walls of the tanks after the tanks have been assembled with relation to each other.

A lid 24 is provided formed of heavy sheet metal and of hollow construction. Insulation 26 fills the space within the lid 24 so that when the lid is in position, the insulation 22 and 26 completely surrounds the vulcanizing kettle to prevent the escape of heat from the interior thereof.

The lid 24 is somewhat heavy and awkward to handle and we therefore provide a crane arm 28 associated with it. The crane arm 28 is mounted on a vertical spindle 30 which is rotatably mounted in a tubular support 32. The support 32 is welded or otherwise secured to the tank 10 and suitable means, such as a collar 34, may be provided to limit the downward movement of the spindle 30 relative to the tubular support 32 within which it is telescopically mounted.

The lid 24 is provided with an upstanding post 36 terminating in an eye member 38. The outer end of the crane arm 28 is received in the eye member 38 and a set screw 40 is threaded through the eye member and engages the upper surface of the crane arm 28. A crank 42 is provided for rotating the set screw 40. A truss rod 44 connects the upper end of the spindle 30 with the outer end of the crane arm 28 to reinforce the arm.

From the construction of the parts just described, it will be obvious that rotation of the set screw 40 in a downward direction will pull the eye member 38 upwardly and consequently the lid 24, such as to the elevation represented by the dotted line position in Figure 2. The crane arm 28 can then be swung to the position of Figure 1 for thus opening the vulcanizing kettle.

For heating the interior of the kettle, I provide a coil of tubing 46 having an intake end 48 at its upper end and terminating in a spiral coil 50 at its lower end. The coil 46 is arranged adjacent the interior surface of the tank 14 and the successive courses of the coil are held suitably spaced by spacer bars 52 or the like, which may consist of flat bars with notches to receive the courses of the coil. It will be noted that the bottom 16 of the tank 14 slopes downwardly toward the center and the spiral coil 50 slopes in a similar manner, spacer bars 54 being provided similar to the bars 52 for properly spacing the courses of the coil 50. The coil 50 at its center terminates in an outlet end 56 sloping downwardly and extending to the exterior of the vulcanizing kettle.

Within the kettle I provide a grate 58 having suitable legs 60 for supporting it on the bottom without bearing on the coil 50. The lid 24 is provided with a temperature responsive indicating device 62 having an indicating face observable on the upper surface of the lid and a bulb 64 responsive to the interior temperature of the vulcanizing kettle. A thermometer or any other temperature indicating device can be used in place of the indicator 62.

In Figure 4, we illustrate a steam generator consisting of a boiler 66 under which is placed a burner 68. The burner may be automatically regulated by the usual type of pressure actuated valve 70 so as to maintain a predetermined steam pressure. A steam pipe 72 extends from the upper end of the boiler to the inlet end 48 of the coils 46 and 50. A condensate return pipe 74 extends from the lower part of the boiler 66 to a three-way valve 76 which is connected with the outlet end 56 of the coils 46 and 50. The valve 76 has an outlet 78 to atmosphere.

In Figure 5, we have shown how electric heating elements 46a and 50a of somewhat similar formation as the steam coils 46 and 50 can be used instead of tubing through which steam or other heating medium can be circulated. Parts of the vulcanizing kettle are given the same reference numerals as in Figure 2 with the addition of the distinguishing characteristic a.

An automatic switch is illustrated at 70a responsive to the temperature within the vulcanizing kettle, as by means of a thermo-responsive bulb 64a, whereupon upon rise of the interior temperature of the vulcanizing kettle to a predetermined degree, will actuate the contacts within the switch 70a to open circuit position.

Any form of adjustable temperature responsive switch available on the market can be satisfactorily used for this purpose.

*Practical operation*

In the operation of our vulcanizing kettle, the kettle may be quickly heated by shifting the valve 76 so that the steam generated will flow through the coils 46 and 50 to heat them. The valve can then be returned to the position shown in Figure 4, whereupon steam will continue to circulate, depending on the rate of condensation occurring within the coils, which in turn is determined by the quantity of rubber goods placed in the kettle and thereby tending to cool its interior.

By way of illustration we have shown in Figure 2 a tire casing 80 on a rim 82 and containing an inner tube 84. The casing 80 rests on the grate or rack 58 and has applied to it a strip of retread material 86. A matrix 88 confines the retread material 86 in its proper position and serves to mold the desired tread design into it. A casing 90 is illustrated having thereon a patch 92 and an air bag or inner tube 94 placed within the casing. An inner tube 96 is illustrated having a patch 98 thereon.

Other inner tubes and casings and rubber goods can be placed within the kettle until it is entirely filled, with the assurance that everything put therein will be properly cured regardless of whether one or more patches on an inner tube, for instance, is an old one or a freshly applied one.

Material to be vulcanized will cool the interior of the kettle, causing condensation of the steam and thus speeding up the circulation until the temperature within the kettle has been raised to the maximum possible for the steam pressure used. Thereafter circulation will be slower and less steam will therefore be used from the boiler 66 so that the regulator 70 would cut down the fuel supply to the burner and only a very small fire would then be necessary to continue the vulcanizing process, which should extend over a period of thirty minutes or so after the interior of the kettle has been raised to the vulcanizing temperature.

Since the kettle is entirely insulated against the escape of heat, it takes but very little fuel to complete the vulcanizing process after the kettle has been heated up subsequent to placing a batch of work therein. There is no loss of heat radiated from parts of the work not enclosed, as in many other types of vulcanizers.

Every part of each article is evenly heated, thus eliminating many of the detrimetal strains encountered with vulcanizers of the type heating only a portion of the article being vulcanized, yet more economy is secured than is possible by the types of vulcanizers now in use.

As soon as one batch of work is removed from the kettle, another batch can be placed therein, this operation requiring a minimum of time and thereby a minimum of heat wastage. The steam does not need to be shut off while taking out one batch of work and putting in another. The coils 46 and 50 can be readily formed of copper tubing, which is easy to form into the desired shape and which normally comes from the manufacturer in the form of a coil.

By our construction, either with the steam or with the electric type, a perfectly dry heat is insured for the vulcanizing work. High pressure steam can be safely used as the steam is confined within the coils and does not come in contact with the rubber itself.

The heating elements 46a and 50a can be built into the interior wall of the kettle or made to surround it with equal effectiveness.

Some changes may be made in the construction and arrangement of the parts of our device and the process can be somewhat varied without departing from the real spirit and purpose of our invention. We therefore intend to cover by our appended claims, all modified forms of structure and use of mechanical equivalents which would be reasonably included within their scope.

We claim as our invention:

1. In a vulcanizing kettle, a closed receptacle, means for insulating said closed receptacle against the escape of heat from the interior thereof, means for heating the interior of said closed receptacle, said closed receptacle including a removable cover of sufficient weight to substantially seal the receptacle against the escape of heat when resting thereon and a swinging crane mounted on said receptacle and connected with said cover to swing it from a position closing said receptacle, the means of connection including a vertically elongated eye element on the cover, said crane extending therethrough, and a set screw threaded in the eye element and engaging the top of said crane.

2. In a vulcanizing kettle, a closed receptacle, means for insulating said closed receptacle against the escape of heat from the interior thereof, means for heating the interior of said closed receptacle, said closed receptacle including a removable cover and a swinging crane mounted on said receptacle and connected with said cover to swing it from a position closing said receptacle, the connection between said crane and said cover including a vertically elongated eye element on the cover, said crane extending therethrough, and a set screw threaded in the eye element and engaging the top of said crane for lifting the cover off the receptacle when the set screw is rotated in one direction.

3. In a vulcanizing kettle, a receptacle, a removable cover therefor, means for insulating said receptacle and said cover against the escape of heat therefrom, a heating element lining the interior wall of said receptacle and the bottom wall thereof, means for causing said heating element to be heated and for controlling it in accordance with the interior temperature of said receptacle and a supporting grate within said receptacle, said grate having legs engaging said bottom wall whereby to support said grate spaced above the portion of said coil of tubing on said bottom wall.

4. In a vulcanizing kettle, a closed receptacle and means for heating the interior of said receptacle comprising a single coil of tubing entering the top of the receptacle, then coiled adjacent the interior wall of said receptacle, then spirally coiled on the bottom of said receptacle and then extending out of the receptacle adjacent the center of said bottom, said coil from its inlet end to its outlet end being arranged on a continuous slope.

5. A vulcanizing kettle comprising an outer tank, an inner tank received therein and spaced therefrom, insulation between said tanks, an insulated cover for said tanks and a single coil of heating medium containing tubing arranged around the interior wall of said inner tank and arranged inverted cone shaped along the bottom thereof whereby moisture in said coil will drain toward the center of the cone-shaped part of the coil.

6. A vulcanizing kettle comprising an outer tank, an inner tank received therein and spaced therefrom, insulation between said tanks, an insulated cover for said tanks, a coil of heating medium containing tubing arranged around the interior wall of said inner tank including the bottom wall of the inner tank, said coil being cone-shaped along said bottom, whereby moisture in said coil will drain toward the center of the cone-shaped part of said coil, and a grate having legs for spacing it above said bottom wall and clear of the cone-shaped portion of said coil for supporting articles to be vulcanized.

NEAL NIELSEN.
CHRISTIAN NIELSEN.